Nov. 30, 1971  T. D. BISHOP  3,623,405

DIE-CUTTING

Filed Dec. 24, 1969

United States Patent Office 3,623,405
Patented Nov. 30, 1971

3,623,405
DIE-CUTTING
Thomas D. Bishop, Solihull, England, assignor to The Deritend Engineering Company Limited, Birmingham, England
Filed Dec. 24, 1969, Ser. No. 887,887
Int. Cl. B31b 1/14
U.S. Cl. 93—58.2 R    2 Claims

ABSTRACT OF THE DISCLOSURE

The invention is concerned with the rotary die cutting of cardboard blanks using a sheet metal forme fixed to one roll and having a pattern of cutting rule fixed to the surface of the forme and provides studs located on either side of the rule to hold the rule to the forme, the studs being laterally resilient so that the rule is gripped between a pair of studs.

---

This invention relates to die-cutting of board and like materials particularly in the manufacture of blanks for erection into cardboard boxes and the like.

The invention is particularly but not exclusively concerned with rotary die-cutting.

In my Pat. No. 3,479,931 there is described and claimed a method of making a die for use in cutting card and like materials, comprising locating a plurality of studs at predetermined positions on a metal forme by individually welding each of said studs to said forme and locating a pattern of cutting rule in relation to said studs to secure the rule to the forme.

The present invention is an improvement in or modification of the invention described in my Pat. No. 3,479,- 931. One difficulty which is found with the invention described in my Pat. No. 3,479,931 arises where the forme is part cylindrical since the studs extend with their axes lying on radii of the drum. This means that where two studs are located close together the clearance between them is at a minimum at the forme and a maximum at their free ends.

Consequently if rule is jammed between them it is apt to be an interference fit at the root but relatively unsupported nearer its cutting edge. It is considered impractical to provide studs with oblique end faces and additionally locate them appropriately so that the clearance between the two studs is substantially parallel over their height and in any event, even if this were done the operation of pushing the rule between such studs would tend to deflect them to a maximum at their free ends.

One solution of this problem which is described in my Pat. No. 3,479,931 is to locate the rule in a slot in a single stud and whilst this avoids some of the difficulties referred to its does necessitate notching the rule since the slot cannot extend wholly to the root of the stud or alternatively it involves packing the rule between the studs so as to ensure that the blind edge of the rule seats on a firm support.

The object of the present invention is to provide a further means of overcoming the difficulties referred to.

In accordance with the present invention from a broad aspect, a rule-locating stud for welding to a die-cutting forme comprises a substantially parallelipiped body having a cylindrical through bore, and a slit opening radially from the bore along the junction between two faces of the stud to form at least one laterally resilient portion.

From another aspect of the invention, a forme for use in rotary die cutting comprises lengths of rule seated upon a sheet metal forme and held in place between pairs of adjacent studs welded to the forme, at least one stud of each pair being laterally resilient.

Figure 1:
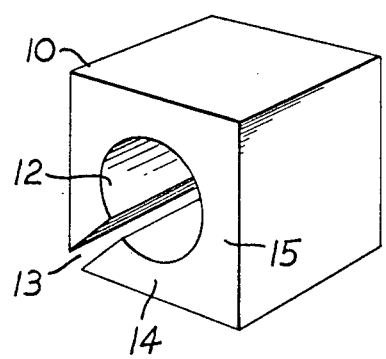
Figure 2:
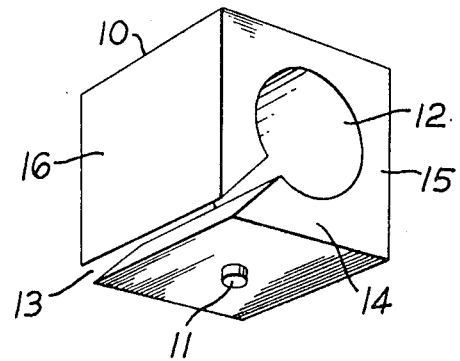
Figure 3:
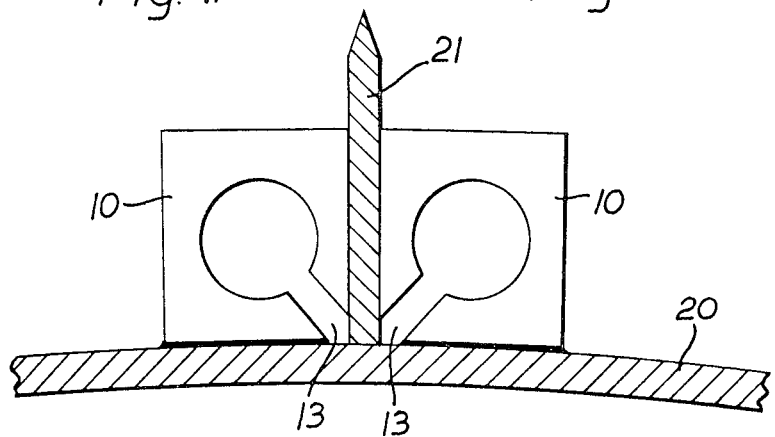

The invention is now more particularly described with reference to the accompanying drawings, wherein:

FIG. 1 is a front perspective view of a stud embodying the invention;
FIG. 2 is a second perspective view of the same stud;
FIG. 3 is a fragmentary section of a forme; and
FIG. 4 is a plan view of the arrangement of FIG. 3.

Referring to the drawings, and particularly FIGS. 1 and 2, the stud 10 comprises a length of substantially square cross-section steel having a spacing pip or projection 11 at the centre of the root, i.e. one end face, whereby arc intensity during welding is controlled and efficient welding obtained with certainty, the said stud being bored at 12 transversely of its axis from one face to the opposite parallel face and being slit obliquely at 13, the slit opening from said bore to a side face laterally of the bore and terminating at a position adjacent the root. Consequently the part 14, 15 lying between the root and the bore and bounded on one edge by the side wall of the slit is comparatively rigid but the lateral face 16 of the stud which is to contact the rule is connected to that root portion by the free end of the stud and the portion adjacent the opposite lateral face. The effect is substantially the same as if a ring is split at one position on its circumference, is welded to the forme on one side of the split and contacts the rule at the opposite end of the ring, i.e. on the opposite side of the split to the welded portion. There is then the length of the ring to provide resilience. Where a substantially parallelepiped stud is provided with a cylindrical bore and a slit opening radially from the bore in the manner described herein the effect is that of a ring of varying cross-section at different points along its length.

Studs of this kind may be used singly in association with adjacent plain studs and because of the normal variation in space between the two stud faces at different points according to the distance from the drum axis, these may be located so that the rule is a push fit in the space between the free ends of the studs and the interference is progressively greater as the rule is pushed towards the roots of the studs, and due to the resilience of the present stud, the one stud will deflect so that the rule is gripped substantially uniformly over the portion of its height which fits between the two studs. Thus the blind edge of the rule will seat directly on the forme and thus avoid the necessity for notching.

Figure 4:
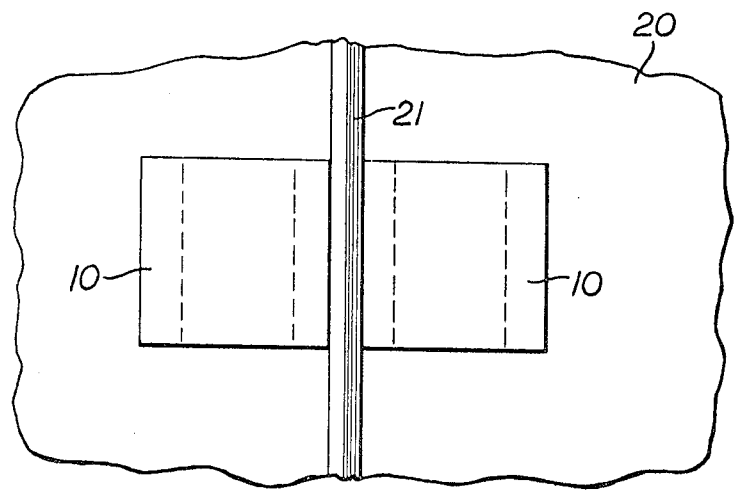

If desired, and as shown in FIGS. 3 and 4, pairs of resilient studs 10 may be used at each of the plurality of points where the rule is to be supported, and it will be appreciated that in this case the studs will be face to face that is to say with the slits 13 from their respective bores opening to their adjacent faces, and with the respective bores having parallel axes. In FIG. 3, the sheet metal forme is shown at 20 and the rule at 21.

It will be appreciated that studs of the kind referred to have to be located in a particular direction so that the face to which the slit opens is located adjacent the rule;

my Pat. No. 3,479,931 describes welding guns having means for controlling the angular position of the studs which will be effective for this purpose.

I claim:

1. A rule-locating stud for welding to a die-cutting forme comprising a substantially parallelepiped body having a lateral cylindrical through bore, and a slit opening radially from the bore along the junction between one lateral face and the bottom of the stud so that such face is laterally resilient.

2. A forme for use in rotary die cutting comprising lengths of rule seated upon a sheet metal forme and held in place between pairs of adjacent studs welded to the forme, at least one stud of each pair being a stud according to claim 1, arranged with its laterally resilient face against the rule.

References Cited

UNITED STATES PATENTS 3,479,931  11/1969  Bishop _____ 93—58

BERNARD STICKNEY, Primary Examiner

U.S. Cl. X.R.

24—255; 83—663